Feb. 13, 1968  R. D. ALABURDA ET AL  3,368,363
PROCESS FOR FREEZING FOOD USING LIQUID REFRIGERANT
Filed May 31, 1966  2 Sheets-Sheet 1

INVENTORS
RAYMOND DANIEL ALABURDA
HARRY AUSTIN BEAM
ADOLPH ANDREW BUEHLER
DENNIS DALE RUDY
BY
ATTORNEY

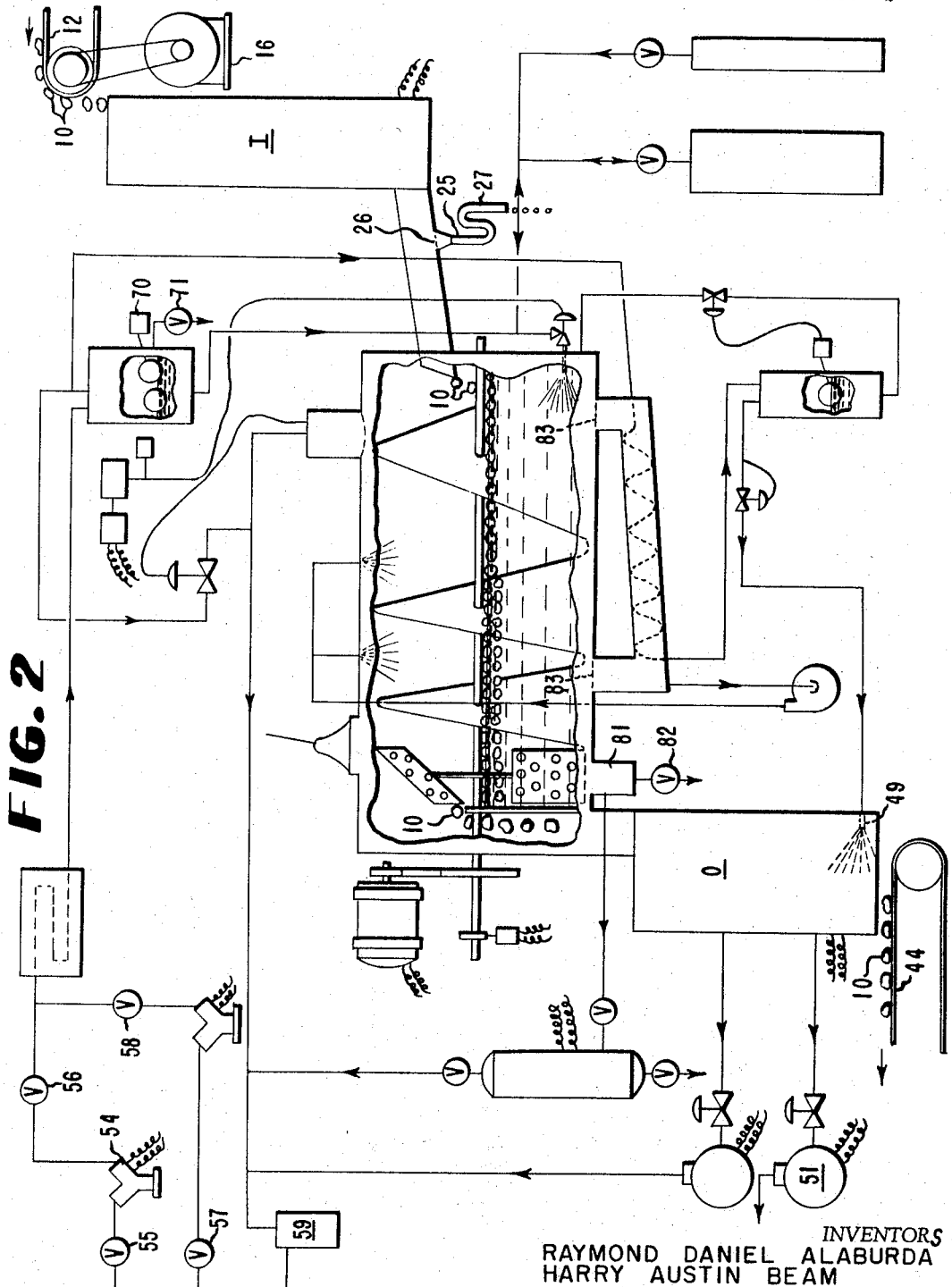

United States Patent Office 3,368,363
Patented Feb. 13, 1968

3,368,363
PROCESS FOR FREEZING FOOD USING LIQUID REFRIGERANT
Raymond Daniel Alaburda, Somerdale, N.J., Harry Austin Beam, Wilmington, Del., Adolph Andrew Buehler, Pennsville, N.J., and Dennis Dale Rudy, Newark, Del., assignors to E. I. du Pont de Nemours and Company, Wilmington, Del., a corporation of Delaware
Filed May 31, 1966, Ser. No. 553,816
6 Claims. (Cl. 62—64)

ABSTRACT OF THE DISCLOSURE

This invention is directed to a novel process and apparatus for the freezing of food in contact with an ebullient freezing agent, hereinafter sometimes referred to as a freezant. More particularly, it deals with the rapid freezing of food in, for example, naturally occurring small particles or cut into relatively small particles. The food to be frozen is fed into a freezing chamber, conveyed in substantial contact with an ebullient freezant, and discharged in a frozen state from the freezing chamber with a minimum intake of air and moisture and loss of freezing agent from the total system. The freezant is efficiently recovered and recycled for reuse in the system. A freezant particularly well adapted for use in the present unique process and apparatus is a fluoro or chlorofluoroalkane such as dichlorodifluoromethane. Foods that may be frozen include fruits, berries, vegetables, meats, and seafood.

---

Figure 1:
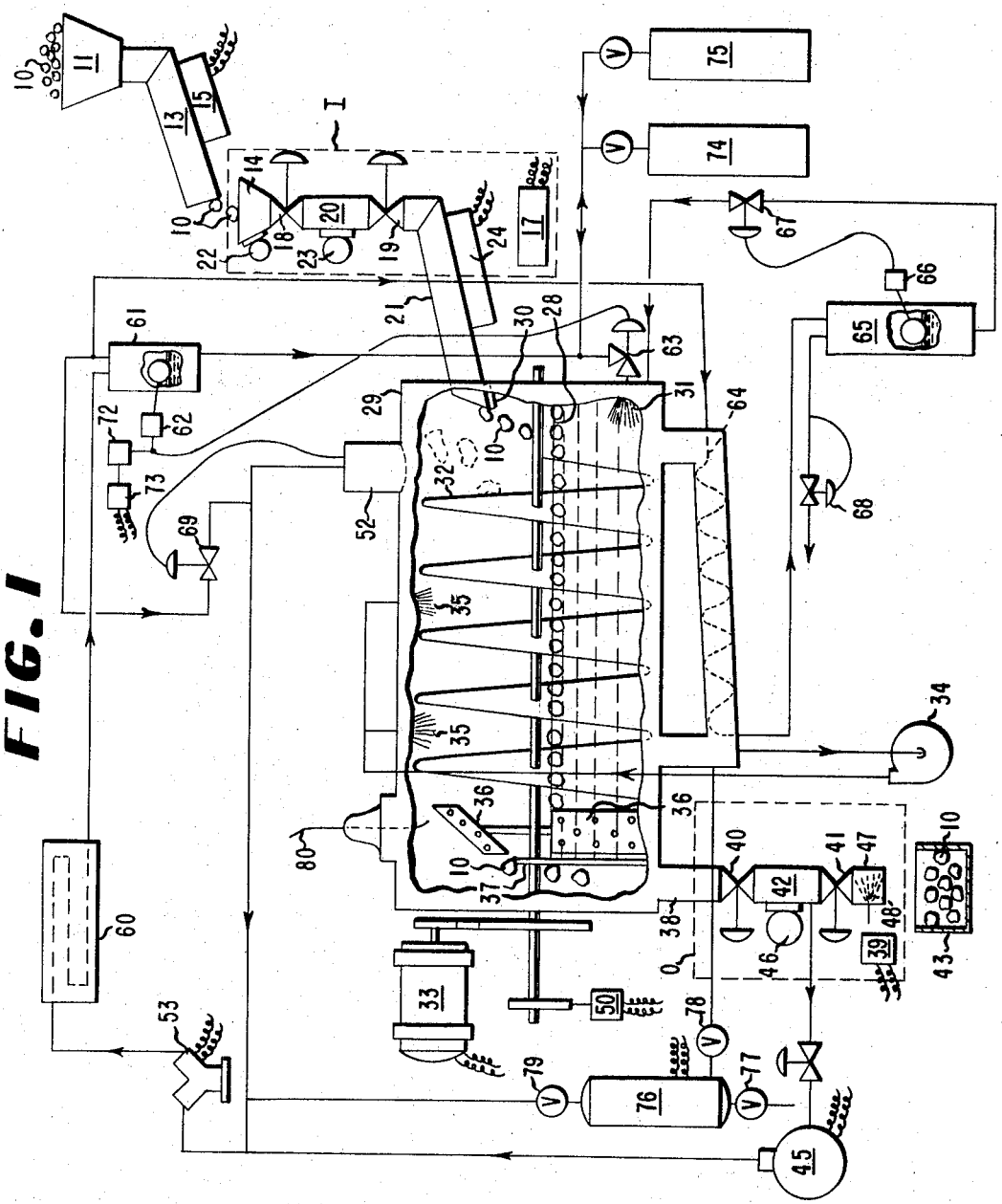

Food is now frozen commercially by direct-contact or indirect-contact freezing. There are three main direct-contact freezing methods, with many variations. (1) Freezing in still air is commonly used wherein the product to be frozen is placed in an insulated, refrigerated room kept at about —15° C. Freezing under such conditions is slow and uneven; the texture of the food may be adversely affected, and deterioration may occur before complete freezing is accomplished. (2) Blast freezing involves the use of blowers that circulate the air in the freezing chamber. The high velocity of the air improves the heat transfer, but the freezing rate is still slow. The food may be damaged through abrasion and dehydration. (3) Immersion freezing consists of immersing the food, for example fish, into a mixture of ice and salt or cold brine. The freezing brine may be sprayed onto the product. Foods in which traces of salt are objectionable may be packaged. Freezing sugar syrup is used in place of brine for the immersion freezing of fruits and berries.

Freezing is also accomplished by contacting the food product with liquid nitrogen, liquid nitrous oxide, liquid carbon dioxide, and nontoxic fluorine-containing compounds that have subzero boiling points. The use of liquid nitrogen as a freezing agent subjects the food to severe thermal shock and causes cracking. The freezing cost with liquid nitrogen is high; one pound of freezant per pound of food is commonly used. Liquid nitrous oxide has the same shortcomings as liquid nitrogen, i.e., cracking of food owing to low temperature of freezing and high freezing cost owing to the high cost of recovering the freezing agent. Liquid carbon dioxide is not widely used as a direct-contact freezing agent as the resulting costs are high and the general carbonation of food is objectionable. The fluorine-containing freezing agents, although well adapted for use and widely applied as refrigerants in food processing and preservation, are not known to be used for extensive immersion freezing by a direct-contact method on a commercial scale. U.S. Patent 3,136,-642 discloses the quick freezing of the moisture in fruits and vegetables as a batch operation by direct immersion in liquid dichlorodifluoromethane as a step in preparing a frozen fruit or vegetable salad. U.S. Patent 2,059,970 describes an apparatus for the quick freezing of articles or packages by travel on an endless belt submerged in dichlorodifluoromethane, with means provided to prevent flotation of the articles in the freezing agent and to hold them upon or against the belt.

Indirect-contact freezing is effected by conducting heat from the food to a refrigerating medium (usually a brine or liquefied gas refrigerant) through metal plates. An extensively used indirect freezer is the multiple plate freezer consisting of hollow plates mounted with adjustable space between them as shown, for example, in U.S. Patents 2,578,829 and 2,697,920. This method of freezing is also slow. Large ice crystals may form within the cells of the food and rupture the cell walls to produce an unattractive defrosted product.

It is, therefore, an object of this invention to provide a novel process for the rapid freezing of food. Another object is to provide such a process for the freezing of food in, for example, particulate form as the food is conveyed in contact with an ebullient freezing agent.

A further object is to provide for the introduction of such food into the freezing chamber and its discharge with a minimum intake of air and moisture and a minimum escape of freezing agent. A still further object is to provide for the essentially complete recovery and recycling, as a liquid, of the freezing agent vaporized in the freezing chamber and removed from the food without plugging valves and/or coating heat transfer surfaces with ice. Another object is to provide an apparatus which will achieve the rapid freezing of food with the aforementioned provisions and advantages.

These and other objects of the invention will be apparent from the following description and claims.

More specifically, the present invention is directed to the process of fast-freezing food in a liquid ebullient halogenated alkane freezant medium having a boiling point within the range of about —5° C. to about —50° C. wherein food is introduced into vapors of said freezant medium as said food free-falls into said liquid freezant medium, which medium is maintained in a turbulent state at the point at which said food contacts said liquid freezant medium, the resulting vapor mixture removed, said food remaining in substantial contact with said liquid freezant medium until frozen.

One preferred embodiment is our process heretofore described wherein the freezant medium component of said vapor mixture is recovered and recycled as a liquid to said liquid freezant medium at a point close to where said medium is maintained in said turbulent state. Another embodiment is one wherein the said freezant medium vapors and liquid freezant medium are maintained in a chamber at a pressure less than atmospheric or where said freezant medium vapors and liquid freezant medium are maintained in a chamber substantially at atmospheric pressure. Our process may be conducted continuously or batchwise.

Another preferred embodiment of the present invention is the process of fast-freezing food in a liquid ebullient dichlorodifluoromethane freezant medium wherein food is introduced into the vapors of said freezant medium as said food free-falls into said liquid freezant medium, which medium is maintained in a turbulent state at the point at which said food contacts said liquid freezant medium, the resulting vapor mixture removed, said food remaining in substantially continuous contact with said liquid freezant medium until frozen. The freezant medium component of said vapor mixture may be recovered and recycled as a liquid to said liquid freezant medium at a point close to where said medium is maintained in said turbulent state. This process may be conducted continuously or batchwise, at a pressure less than atmospheric or at substantially atmospheric pressure.

Our invention process also encompasses the process of fast-freezing food in a liquid ebullient halogenated alkane freezant medium having a boiling point within the range of about −5° C. to about −50° C. wherein food is introduced into said liquid freezant medium at a point where said medium is maintained in a turbulent state, the resulting vapor mixture containing freezant vapor, water and air removed, said food remaining in substantial contact with said liquid freezant medium until frozen; the freezant vapor component may be recovered and recycled as a liquid to the freezant medium and the process may be run continuously; pressures less than atmospheric and substantially atmospheric may be utilized.

Our invention also encompasses apparatus for the fast-freezing of food in a liquid ebullient halogenated alkane freezant medium having a boiling point within the range of about −5° C. to about −50° C., said apparatus comprising, in combination.

(1) Enclosed freezing chamber means containing said liquid freezant medium;

(2) A first valve control means through which food is introduced into said freezing chamber, said means essentially precluding direct contact between the atmosphere and the inside of said freezing chamber;

(3) Means for substantially removing the vapor mixture of freezant medium vapor, water and air present as said food is introduced and free-falls into said liquid freezant medium;

(4) Means for substantially recovering the freezant medium component of said vapor mixture (3) and recycling same to the liquid freezant medium as a liquid;

(5) Means for maintaining said liquid freezant medium in a turbulent state at the point at which said food free-falls into said liquid freezant medium;

(6) Means for conveying said food within said freezing chamber in contact with said liquid freezant medium;

(7) A second valve control means through which resulting frozen food is removed from said freezing chamber, said means essentially precluding direct contact between the atmosphere and the inside of said freezing chamber;

(8) Means for substantially removing any of said freezant medium remaining in contact with the resulting frozen food after its removal from said freezing chamber and prior to its contact with the atmosphere; and (9) Means for substantially recovering any resulting freezant medium vapors from said means (8) and means for recycling same as a liquid to said freezing chamber.

Specific invention apparatus embodiments include that wherein said freezing chamber means (1) has means for maintaining therein a pressure less than atmospheric and means for maintaining substantially atmospheric pressure therein.

Our novel apparatus may also have vacuum means for removing any of said freezant medium in contact with the resultnig frozen food after its removal from said freezing chamber and prior to its contact with the atmosphere. In addition said apparatus may have means for recovering the removed freezant medium and recycling said freezant medium as a liquid to said freezing chamber.

A large variety of foods may be advantageously frozen by practicing the invention process and using the invention apparatus. This method of freezing the food often results in a more attractive appearance or texture of the food than when the food is frozen with existing commercial equipment. The more attractive appearance is particularly noticeable in foods which, when refrigerated by the usual commercial methods, have their cell walls severely ruptured by large ice crystals that form under conditions of relatively slow freezing. Food not acceptably frozen heretofore can be satisfactorily refrigerated and frozen by the rapid freezing action of an ebullient freezing agent in the invention apparatus. Foods usually frozen heretofore in solid packaged blocks by plate freezing are now made available in individual free-flowing frozen particle form. Frozen foods which suffer from dehydration or mechanical damage in blast freezers are frozen unaltered by the invention process and apparatus.

Celery, eggplant, green peppers, radishes, tomatoes, and mushrooms are example of vegetables that are much more favorably frozen when practicing this invention. Grapefruit and orange sections and pears represent fruits that are not now frozen to any extent but which may be acceptably frozen by the invention process. Such fruits as apples, cantaloupes, peaches, pineapples, cherries, and strawberries, that are sometimes frozen in sugar syrups or made available in frozen solid block form, are readily and satisfactorily frozen in individual particle free-flowing form with an ebullient freezant as described below. Grapes and sliced avacadoes, conventionally frozen as pulp, are similarly frozen in the invention apparatus. In each case the large-size fruits and vegetables are preferably sliced, diced, or cut into balls. Blueberries and raspberries are individually quick-frozen by the invention process to provide distinctly superior frozen products; the slow freezing of blueberries, for example, results in a defrosted berry that is tough and rubbery in texture. The berries are graded, stemmed, washed, and placed in suitable condition for direct consumption immediately before freezing. The larger fruits, apples, apricots, peaches, plums and the like, are peeled, pitted, and prepared in final portions ready for consumption in halves, quarters, or smaller pieces.

Vegetables such as peas, beans (lima, shell), cut string beans, small or diced beets, diced carrots, asparagus pieces are well adapted for flow into the freezing chamber and yield free-flowing satisfactory, frozen products.

French fries and meats such as beef, pork, veal, lamb, and fowl, and seafood, such as scallops, shrimp, fish sticks and the like, are also satisfactorily preserved by freezing by the invention process and apparatus. Normally chunks of meat or seafood are cut into pieces of suitable size and shape, such as cubes that are adapted for use in stews, soups and the like, and they may be coated with appropriate material such as bread crumbs, flour, corn meal and the like.

Freezing agents or freezants suitable for use in the invention process and apparatus are compounds or mixtures of compounds having normal boiling points within the range of about −5° C. to about −50° C. and a liquid density (g./cc.) great enough at the boiling point to float food. At temperatures above −5° C. freezing of food is extremely slow or fails to occur. At temperatures below −50° C. undesirable cracking of food may take place. Recovery of freezants having boiling points below −50° C. may impose the need of supplying higher compression pressure and using coolants other than water for condensing, thus adding to freezing costs. The preferred freezing range is from about −20° C. to about −30° C. Consequently, freezants boiling within this range are preferred.

The density of the freezant at boiling temperature at atmospheric pressure must be sufficient to cause the food being frozen to float and thus readily be conveyed on the surface of the liquid. The density of freezants specified herein at room temperature will be less than the density under freezing conditions. This density limitation also allows extraneous matter of higher density than the freezant to be separated from the food by sinking to the bottom of the freezing chamber. In spite of the utmost precautions, small stones, pieces of metal, and fragments of glass may become mixed with the food. A ready and certain means for a final separation of such foreign material better assures the production of frozen food free from such contamination.

Freezants with a combination of boiling point and density that falls within the above limits are fluoro- and chlorofluoroalkanes such as:

| | Boiling point, ° C. | Density (g./cc.) at 25° C. |
|---|---|---|
| Octafluorocyclobutane | −6 | 1.48 |
| Dichlorodifluoromethane | −30 | 1.31 |
| Chloropentafluoroethane | −39 | 1.29 |
| Chlorodifluoromethane | −41 | 1.19 |

Mixtures of these freezants and of these freezants with other compounds also provide suitable freezing media so long as the mixtures have a boiling point and density within the already defined limits. An azeotropic mixture, i.e. a mixture that yields a distillate of the same composition as the mixture and undergoes no change in properties with evaporation, is particularly suitable. Qualified mixtures provide a means of extending the freezing range or of obtaining intermediate freezing temperatures not obtainable with a single component freezant. Mixtures permit the use, as a second component, of a compound not having the boiling point or density to qualify for use by itself but giving an acceptable and sometimes advantageous freezing mixture when used with another freezant. An azeotrope is not necessarily formed nor is its formation essential, since the evaporation that occurs within the freezing chamber does not result in a troublesome change in properties of the freezing mixture when the initial composition of the mixture is properly chosen.

Representative mixtures of the aforementioned freezants are those of dichlorodifluoromethane, chlorodifluoromethane, one of which forms an azeotrope with the composition of 25/75 dichlorodifluoromethane/chlorodifluoromethane by weight having a boiling point of −41° C. and a density at 25° C. of 1.22. Another series of mixtures is that of chlorodifluoromethane and chloropentafluoroethane which provides an azeotrope wtih the composition of 49/51 chlorodifluoromethane/chloropentafluoroethane by weight having a boiling point of −46° C. and a density of 1.24. Mixtures of dichlorodifluoromethane and 1,1-difluoroethane (B.P. −25° C., density at 25° C. 0.89) provides freezants within the temperature range of −25° C. to −32° C. at atmospheric pressure and a density greater than one when the 1,1-difluoroethane content of the mixture is restricted to about 65% or less by weight. The preferred mixture of these two components is an azeotrope with a boiling point of −32° C., a density of 1.17 at 25° C., and a content of 1,1-difluoroethane of 26% by weight.

A suitable component of freezants to provide intermediate freezing temperatures is 1,2-dichlorotetrafluoroethane having a boiling point of 3.8° C. and a density of 1.43. The permissible freezing temperature ranges provided by mixtures of 1,2-dichlorotetrafluoroethane and freezing agents for the invention process, together with the corresponding permissible composition ranges, are given in the following table:

FREEZING MIXTURES OF 1,2-DICHLOROTETRAFLUOROETHANE

| Second Component | Freezing Range, −5° C. to X° C. | Composition of mixture Y% to 0% 1,2-dichlorotetrafluoroethane |
|---|---|---|
| | X | Y |
| Dichlorodifluoromethane | −30 | 88 |
| Chloropentafluoroethane | −39 | 90 |
| Chlorodifluoromethane | −41 | 95 |

Representative examples further illustrating the present invention follow.

*Example 1.—Fifty pounds per hour freezing apparatus*

For an illustration of the invention process and apparatus reference is made to FIGURE 1. FIGURE 1 is a schematic drawing of an apparatus for the continuous freezing of about 50 lbs. of food per hour in a substantial contact with an ebullient dichlorodifluoromethane freezant.

Freshly picked, shelled, and washed lima beans, represented by 10, were loaded into hopper 11 from where they passed through duct 13 to a second hopper 14 when vibrator 15 was energized on signal from a sequence controller 17. The beans were conducted through a set of synchronized valves in the inlet system I to the freezing chamber 29. These intake valves were operated in sequence to minimize the loss of freezing agent vapor, to reduce to a minimum the intake of air and moisture, and to avoid damage to the food 10. Only one of the inlet valves 18 and 19 was opened at a time to permit a charge of beans to drop from the inlet hopper 14 through open valve 18 to chamber 20 and, while valve 18 was closed, from the chamber through open valve 19 to inlet chute 21. These intake valves are commercial 2.5 inch internal diameter pinch valves with rubber linings. Pneumatic vibrators 22 and 23 were provided to ensure that an entire charge of food drops cleanly through the open valves. An adjustable speed vibrator 24 on the inlet chute kept the incoming food particles dropping separately into the boiling freezant (dichlorodifluoromethane) 28 in the freezing chamber 29. Freezing of food or entrained water at the end of the chute 21 was prevented by electric heater 30. The freezing chamber is a transparent acrylic plastic cylinder 10 inches in diameter and 30 inches in length.

Efficient transfer of heat from the food 10 was assured by the agitation provided by the ebullient freezing agent, by the dropping of separated food particles, and by the return of the recovered freezing agent through jet 31 located in the food drop area. The lima beans were at once frozen superficially and so glazed over their surface that they did not agglomerate as they floated into the area swept by a screw conveyor 32. This conveyor measures 9⅞ inches in diameter and has five 5-inch pitch flights. The speed of the conveyor and the residence time of the food in the freezing chamber was controlled by a variable speed drive 33. The beans were held in the freezing chamber for about two minutes.

The food floated on the freezing agent as a mono layer or accumulated in multi-layers above the surface of the freezant as it moved through the freezing chamber. To ensure complete freezing in these multi-layers, the food may be sprayed with freezant circulated by pump 34 through spray jets 35.

The beans were moved through the freezing chamber into the area swept by discharge scoops 36. These scoops are preferably two in number, perforated to allow the liquid freezant to flow out, curved to facilitate the pickup and holding of food, and set at an angle to discharge food over barrier 37 into discharge duct 38. The beans were then removed from the freezing chamber by a second set of synchronized valves in the outlet system O. This operation was accomplished as follows: Sequence controller 39 caused outlet pinch valves 40 and 41 to open one at a time to let a charge of food drop from outlet duct 38 to chamber 42 whence the food dropped to container 43. This system of valves, like those on the food intake side of the freezer, served to reduce loss of freezing agent vapor and to keep air and moisture out of the system and is arranged to avoid food damage, although the hard frozen food was less susceptible to damage than the unfrozen food. In closed chamber 42 the lima beans were subjected to a vacuum at about 27 inches of mercury created by vacuum pump 45 to reduce the amount of freezant which may be left on the food and to recover small but significant amounts of freezant carried away from the freezing chamber with the food. Pneumatic vibrator 46 assured complete emptying of chamber 42 through lower outlet valve 41 into outlet duct 47. This duct was kept flushed with dry air through jet 48 to exclude the ambient moist atmosphere, to keep ice from forming on the discharge valve and duct surfaces, and to avoid freezing of food to the valve or duct. To prevent closing of the upper outlet valve 40 while food is passing through it, cam-operated switch 50 was synchronized with the travel of the discharge scoops.

Dichlorodifluoromethane (freezant) gas formed within the freezing chamber was conducted to the recovery system through the outlet 52 located near the intake end of the freezing chamber. The recovery system for the freezing agent comprises a water-cooled, two-stage, non-lubricated compressor 53 having a capacity of 8 a.c.f.m. (actual cubic feet per minute) and operating at a discharge pressure of 200 p.s.i.g. It delivers compressed freezing agent gas to a water-cooled primary condenser 60 from which a liquid water-dichlorodifluoromethane mixture flows to primary gas-liquid separator 61. The separated liquid freezing agent is returned by liquid level controller 62 to the freezing chamber through letdown valve 63 in jet 31. Any uncondensed gas from the primary separator 61 is passed through secondary condenser 64 located at the base of the freezer and cooled with freezing agent circulated by the pumping action of the screw conveyor. Condensate from this condenser is collected in a secondary gas-liquid separator 65 and returned to the freezing chamber by liquid level controller 66 through valve 67. Any uncondensed gas from this separator is vented to the atmosphere through back pressure valve 68. Part of the gas stream from primary separator 61 is returned to the compressor inlet through control valve 69 as required to maintain the pressure within the freezing chamber at 0 to 5 inches of water below the prevailing atmospheric pressure so as to prevent the loss of gaseous freezing agent.

Water that enters the freezer with the food tends to freeze into small pieces of ice which float and are removed without trouble with the food particles. Moisture that condenses and freezes in the vapor phase above the food drop area is carried off as snow-like particles with the exit stream of freezing agent gas to the compressor. The moisture accumulates as an upper liquid layer in the primary gas-liquid separator 61. It is discarded as required through conventional valve means.

Any water that is entrained in the recovered liquid freezant freezes as the freezant passes through letdown valve 63. Such freezing occurs because the pressure on the liquid freezing agent is reduced from a high value (i.e. 200 p.s.i.g.) to atmospheric pressure, and the temperature of the liquid suddenly falls to −30° C. The ice that forms under these conditions may pass into the freezing chamber as particles and float away harmlessly or it may build up on the letdown valve passages, impeding the flow of freezant. This coating of valve surfaces with ice occurs even though the valve is an angle-bodied valve with smooth flow passages and is mounted as closely as possible to the wall of the freezing chamber. As the accumulation of ice within the valve reduces the flow of freezing agent the liquid level of material in primary separator 61 rises and is measured by a pneumatic level controller 62 connected with a 20 p.s.i. air supply from a conventional source. As the liquid level rises, the output air pressure to the letdown valve increases. This condition causes the valve to open wider to permit an increased flow of liquid freezing agent. If ice has restricted the valve opening the liquid level keeps increasing. When the full available control pressure fails to effect a valve opening, pressure switch 72 detects this pressure and energizes repeat cycle timer 73. The timer in turn actuates a three-way solenoid valve which pulses the control pressure to the letdown valve rapidly, moving the valve open and shut until the ice is dislodged and the liquid level in the separator is restored to normal. The pressure switch now deactivates the repeat cycle timer and the solenoid valve until the next accumulation of ice occurs. In this automatic manner the letdown valve is kept free of ice without interruption of the performance of the freezer. Such control of the letdown valve is important to the trouble-free operation of the invention process and apparatus.

Whenever it is desired to discontinue freezing for an extended time the charge of liquid freezant in the apparatus can be delivered by the recovery system to storage tank 74. The supply tank 75 is a standard shipping container for the freezing agent.

An electrically heated vaporizer 76 is provided to separate, as may be required, the freezant from accumulated food oils or other contaminants. Liquid freezant flows by gravity from the base of the freezing chamber to the vaporizer. Take-off freezant vapors are directed to the compressor inlet while residues in the vaporizer are removed through valve 77. Valves 78 and 79 connect and disconnect the vaporizer and the freezing apparatus.

All metal parts of the food freezing apparatus that come into contact with the food are made of stainless steel. Suitable thermal insulation is applied to the heated and cooled surfaces to conserve power and protect operating personnel. Rods 80 (one is shown in this figure) are provided for manually dislodging ice or food particles, if necessary.

About 250 lbs. of lima beans were frozen as described in the illustrated apparatus over a period of five hours. The loss of dichlorodifluoromethane freezant amounted to about four pounds per 100 lbs. of beans frozen. Recovery of the freezing agent was at least 99.0%. The recovered frozen product contained less than 200 p.p.m. of dichlorodifluoromethane; it had an attractive appearance in color and texture. When defrosted and cooked, the resultant lima bean vegetable was judged uniformly to be of fine quality.

The freezing apparatus was also operated with dichlorodifluoromethane freezant to freeze sliced and diced carrots and potatoes; French fried potatoes; a vegetable mixture containing lima beans, corn, and carrots; shrimp; scallops; fish sticks, plums; grapes; and strawberries. In each case freezing was rapid, an attractive frozen product was obtained, and the defrosted product as prepared for consumption was highly acceptable.

The dichlorodifluoromethane freezant in the freezing apparatus was replaced with octafluorocyclobutane as freezant, and the freezer was then used to freeze peas. The residence time was increased from about two minutes for lima beans frozen with dichlorodifluoromethane at −30° C. to about four minutes, owing to the higher freezing temperature provided by the octafluorocyclobutane (−6° C.). A good appearing, fine quality, frozen product was obtained.

*Example 2.—Three hundred pounds per hour freezer*

An apparatus for the continuous freezing of food at the rate of about 300 lbs. per hour comprises the novel combination of elements described in Example 1 and embodies the same process operating principles. A schematic layout of this apparatus is shown in FIGURE 2 with added auxiliary equipment shown as numbered parts.

The freezing chamber of the 300 lb. per hour unit is a stainless steel round-bottom trough having a semi-cylindrical bottom of 9⅞" radius, straight sides above this bottom section measuring 12¼" in height, and a plastic viewing window along the front side of the trough to provide a sight of the conveyor screw. Its inside length is six feet. This freezing chamber is fitted with a screw conveyor having a first flight of 15" pitch set 7" from the intake end of the compartment followed by 9 flights of 5" pitch, each flight having a 9¹³⁄₁₆" radius. The conveyor is positioned to give ⁵⁄₁₆" clearance above the center of the bottom of the trough. The shaft bearing the conveyor flights is fitted at the discharge end with four perforated scoops for lifting food from the freezing bath. These scoops are stainless steel pieces about 10" square when flat, curved one way on a 6" radius to form a ladle, rounded with one side to clear the wall of the freezer, and mounted at an angle. The freezing chamber is also fitted with a sump 81 for the collection of heavy extraneous material introduced with the food which material is periodically discarded through valve 82. Screens 83 in the bottom of the freezing chamber at the openings to the secondary condenser are installed to keep foreign matter out of the condenser.

The valve systems for passing the food into the freezer and discharging it are identical in design with those shown in FIGURE 1 at I and O. The intake pinch valves measure 5" in internal diameter while the discharge pinch valves are 6" in internal diameter.

The freezant vapor compressor has a capacity of 75 a.c.f.m. The apparatus of FIGURE 2 is fitted with an external endless conveyor 12 to bring food prepared for freezing to the inlet system I. The sequence controller for the operation of the intake valve system also controls drive motor 16 for conveyor 12 to avoid over-filling the inlet hopper. The inlet chute from the lower intake valve to the freezing chamber has a drain for excess water, shown at 25, covered by screen 26 and connected with trap 27, arranged to prevent the entry of air into the system at this point. An endless conveyor 44 carries the frozen food from beneath the outlet system O. The cold dry uncondensed gases from the secondary gas-liquid separator are discharged into the exit duct of the outlet system in jet 49 to aid in repelling the ambient moist atmosphere.

Example 1 describes how food is subjected to vacuum to remove and recover freezing agent carried to this point on the food. Air that normally fills the vacuum chamber when the food is released may contain large amounts of moisture. To retard the buildup of ice from the moisture-laden air within the discharge vacuum chamber, the chamber is kept partially evacuated by vacuum pump 51 when the valves are closed and the freezant removing pump is not in operation.

A standby compressor is shown at 54. This unit is placed in service when the freezing apparatus is to be maintained in readiness for immediate use after periods when food is not being frozen. Valves 55 through 58 are provided to place either the main compressor or the standby compressor in service. Surge chamber 59 dampens pulsations in the freezant vapor return line and prevents the entry of liquid freezant into the suction lines of the freezant compressors.

The mechanism for keeping the letdown valve in continuous operation and free from plugging with ice is the same as described in Example 1. The gas-liquid separator for the 300 lb. per hour apparatus is equipped with a second liquid level controller 70 to indicate the accumulated water level within the separator and to give a warning signal for discharge of the water through valve 71.

Following the procedure described in Example 1 and employing the apparatus of FIGURE 2 with dichlorodifluoromethane as freezing agent, strawberries, for example, were successfully and rapidly frozen at a rate of 325 lbs. per hour to provide a frozen and defrosted product most attractive in color, taste, and texture. Similarly, cut beans, 2-inch pieces of cauliflower, 2-inch to 4-inch lengths of asparagus, Brussels sprouts, and peas were frozen in the apparatus with a consumption of freezing agent of about 2 lbs. of freezant per 100 lbs. of food and a recovery of the freezing agent of at least 99%. The various recovered frozen products contained less than 200 p.p.m. of freezant.

Other freezant mediums, as heretofore characterized, may be utilized in the practice of our invention process and apparatus to achieve essentially the same results.

The fast-freezing of food according to the present invention provides a means of economically storing the food in bulk, of packaging it on order for distribution in any desired quantity, and of making it conveniently available to the consumer for use without waste or delay. A free flowing frozen food, as opposed to the common blocks of frozen fruits and vegetables, results from introducing the food into the freezing chamber as separated particles, i.e. bean, French fry, or fish stick and keeping the particles separated until an ice glaze or frost coating is formed on their surface. Although the natural occurring moisture in the food and any water residues from a previous treatment such as blanching, washing and the like freezes rapidly when the food meets the liquid freezing agent, the food must be kept in a turbulent state until the moisture and water freezes sufficiently to prevent agglomeration of the food.

The turbulence required to keep the food separated in the initial stage of freezing may be supplied, in part, by the turbulent action of the liquid freezing agent medium when the recovered freezant is returned to the freezing chamber as a liquid under pressure. Thus this returning of freezing agent to a point close to the food drop area provides a constant vigorous splashing agitation to keep the incoming food particles separated. Further turbulence occurs at the surface of the freezing agent medium when the relatively warm food comes into contact with the low boiling liquid freezant medium and causes rapid evaporation. As the food is conveyed from this turbulent region the exterior coating of ice and frost prevents agglomeration during the balance of the freezing process as food is piled deeper to complete the freezing.

The required turbulence may also be provided by recirculating liquid freezant to provide a bubbling flow of liquid on the surface at the food drop area. A mechanical agitator may then be installed to keep the freezant surface sufficiently disturbed to keep the food particles separated for the initial freezing.

A freezing agent which may be utilized in the invention process and apparatus is dichlorodifluoromethane which may form, in the presence of water vapor, a crystalline or semi-solid hydrate which is stable at freezing temperatures but readily decomposes into the freezing agent and water at a temperature above the freezing point of water. Moist air entering the freezing chamber with the food may form a freezant hydrate visible as fog or snow-like particles. If particles of hydrate become deposited on the surface of a food they impart an unattractive frothy appearance when the food is warmed to room temperature owing to the decomposition of the hydrate and the vaporizing of the freezing agent component of the hydrate. Hydrate formation should, therefore, be avoided or held to a minimum by essentially precluding direct contact between the atmosphere and the freezant vapors within the freezing chamber. Hydrate that is accidentally formed is swept away from the food and removed from the freezing chamber in the stream of freezant vapor constantly flowing, for example, to the suction side of a compressor. To effect a rapid and substantial removal of any hydrate that forms, the freezant vapor discharge duct leading to the compressor is preferably located near the food intake chute where moist air may inadvertently come in; this substantially avoids the contamination of food being frozen with hydrate which may be formed.

When hydrate particles are swept out of the freezing chamber in the freezant vapor stream they are decomposed by the heat of compression in the compressor. From that point on the freezing agent is kept above the decomposition temperature of the hydrate until the freezant is returned to the freezing chamber through the letdown valve. The water from the hydrate is separated from the freezant in the separator as already described.

Although water-cooled two-stage non-lubricated reciprocating freezing agent compressors were used as described in representative Examples 1 and 2, other types of compressors may be employed. With adequate oil separators, lubricated reciprocating compressors would be satisfactory. For large installations centrifugal compressors could be used.

Condensation of vented freezing agent at temperatures above 0° C. avoids problems of ice or hydrate coating of heat exchanger surfaces. Because of the widespread availability of refrigerating equipment designed for use at −40° C., condensation at this temperature can be used if the equipment is suitably designed. Multiple condensers can be used by providing for intermittent service periods wtih provisions for mechanical or thermal removal of ice. Scrubbers, centrifuges or other gas cleaning equipment could be used to remove ice and hydrate particles enroute to the condensers.

The freezing chamber may be fitted with a screw conveyor and conveniently fabricated to have a cylindrical shape in that section which bears the conveyor. Such a shape permits a required low clearance between the outer edges of the flights of the conveyor and the wall of the freezing chamber at the intersection of the surface of the freezing agent and the wall of the chamber. With a low clearance at the surface of the freezing agent food is carried through the freezing chamber without being crushed between a conveyor flight edge and the freezer wall and without moving backwards. A clearance at the bottom of the chamber permits the back flow of the freezing agent from the discharge to the intake end of the chamber with circulation through the secondary condenser. It also allows for the movement of extraneous material toward and into a sump. So long as a clearance of the order of $\frac{1}{16}''$ to $\frac{1}{8}''$ between the conveyor flights and chamber wall is maintained at the surface of the freezing agent the bottom clearance can vary widely from $\frac{1}{16}''$ to several inches or more and the shape of the bottom of the freezing chamber is unimportant.

The flights of such a screw conveyor may vary in number and pitch so long as the food particles have space to float freely on the surface of the freezing agent between flights near the intake end. Any mono layer of food should float on the surface and not be caught between flights above the surface because the pitch of the flights is too small or the food particles are too large. The flights may be of variable pitch as shown in FIGURE 2, whereby food coming into the area encompassed by the flights of smaller pitch than the pitch of the flight or flights at the intake end of the conveyor shaft is pushed together and forms multilayers. By this time the food is partially frozen, its surface is glazed with ice, and the particles do not adhere and freeze together. The food held above the surface of the freezing agent in the multilayers may be completely frozen for example by an overhead spray of the freezing agent or by positioning stirrer rods at various points between the conveyor blades. A screw conveyor may be built to run at variable speed, that is, a conveyor having flights of uniform pitch and a two-section shaft to enable one end of the conveyor to rotate faster than the other. Usually the intake end of the conveyor will turn faster than the section at the discharge end. Under these conditions food piles up between the slower turning flights to form multilayers that may be sprayed or stirred to complete the freezing.

The rate of supply of food to the freezer is varied by changing the time food remains in chamber 20 between the intake valves and by adjusting the agitation provided by vibrator 24 of FIGURE 1. Residence time in the freezing chamber is governed by the rate of screw conveyor operation. Variations in the rate of discharge of the frozen food are controlled by changes in the time food remains in the discharge vacuum chamber. Thus the input, residence time, and time for discharge can be synchronized for a given food to obtain a fully frozen product bearing a minimum amount of freezing agent. The freezing chamber may be operated effectively under pressure, at atmospheric pressure or at a pressure less than atmospheric.

The intake and discharge valve types may be varied and are not restricted to the pinch valves designated in the examples. The size of the valve is determined by the amount of food that must pass in a unit time to keep the freezer operating at capacity. Since the function of the valves is to reduce leakage of freezing agent and to restrict the amount of air and moisture that gets into the system a valve that accomplishes these purposes and operates readily and continuously without damaging the food, particularly on the intake side of the apparatus, will be useful. For example, in place of the designated pinch valves, twist valves may be used. Twist valves are essentially flexible rubber tube connectors when open. They are closed by twisting one of both ends of the tubes at a connecting point.

The rate of evaporation of the freezing agent within the freezing chamber will vary with the input rate and the initial temperature of the food and with the heat of evaporation of the freezing agent. The amount of freezing agent evaporated as such or as hydrate will vary from about 300 lbs. to 700 lbs. of freezing agent per 100 lbs. of food. A compressor to handle this amount of freezing agent vapor must be provided. The compressor is suitably operated at a pressure within the limits of 30 p.s.i.g. to 200 p.s.i.g. so as to permit a freezing agent/water mixture to condense above the freezing point of water, say, at a temperature between about 4° and 35° C. Such a temperature of condensation is chosen to facilitate ready transfer and ultimate removal of the water as a liquid.

Some water is unavoidably retained by the recovered freezing agent. When the agent is released from the high pressure under which it is compressed, condensed, and held in the primary separator to atmospheric pressure in passing through letdown valve 63 (FIGURE 1) its temperature drops to −30° C. and any water present forms ice. How the letdown valve is kept from plugging with ice is described in Example 1. In place of the pneumatic level controller an electronic level controller or a combination of a pneumatic level transmitter and a pneumatic level controller or of an electronic level transmitter and an electronic level controller may be used. Either controller may be fitted with automatic reset.

In the practice of our invention process, the food unit being frozen is initially encapsulated; this encapsulation (1) substantially avoids direct contact of said food unit with the liquid freezant medium, (2) physically protects the food unit and (3) maintains the natural state of the food unit.

The turbulent characteristic of the liquid freezant medium into which the food units are first introduced avoids agglomeration of the food units being frozen. This turbulence is maintained, for example, by the heat loss of the liquid freezant medium where the food units first contact the liquid freezant medium, by the vaporization of recycled liquid freezant medium which has been recovered from the resulting vapor mixture heretofore described and/or supplemental mechanical means herein exemplified and alternate equivalent means obvious to one skilled in the art.

Our invention process and apparatus may be operated continuously or intermittently, preferably continuously from a practical viewpoint. By intermittent operation we means that the introduction of food, removal of resulting vapor mixture, recycling of recovered freezant and discharge of frozen food may be intermittent singly or in various combinations.

The food freezing rate is based on the time needed to fast-freeze a given unit of food. For example, the 300 lb. rated unit is based on an approximate 15-minute period for freezing food. If less than 15 minutes is needed, the capacity of the system will increase subject to, for example, compressor load capability. If more than 15 minutes is required to freeze a given unit of food, the feed rate of the unit will obviously be lower.

The preceding representative examples may be varied within the scope of the present total specification disclosure, as understood and practiced by one skilled in the art to achieve essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are as follows:

1. The process of fast-freezing solid food particles to free-flowing frozen particle form which comprises
   (1) maintaining a freezing chamber containing a liquid ebullient fluorine-containing halogenated alkane freezant of 1-4 carbon atoms having a boiling point within the range of about −5° C. to about −50° C. and a liquid density great enough at the boiling point of the freezant to float food particles,
   (2) allowing said food particles to free-fall into said liquid freezant, and
   (3) allowing said food particles to float in said liquid freezant until frozen, while continuously conveying said food particles through said freezing chamber away from the point at which said food particles free-fall into said liquid freezant.

2. The method of introducing solid food particles into a liquid ebullient fluorine-containing halogenated alkane freezant of 1-4 carbon atoms having a boiling point within the range of about −5° C. to about −50° C. and a liquid density great enough at the boiling point of the freezant to float said particles which comprises maintaining a freezing chamber containing said liquid freezant, allowing said food particles to free-fall into said liquid freezant and float in said liquid freezant while continuously conveying said food particles away from the point at which they free-fall into said liquid freezant.

3. The method of claim 2 in which said liquid freezant is dichlorodifluoromethane.

4. The method of claim 2 in which contamination of said food particles with freezant hydrate formed when moist air enters the freezing chamber with said food is avoided by removing said hydrate from the vapor space in said chamber in a stream of freezant vapors, compressing said stream of freezant vapors thereby decomposing the freezant hydrate, condensing the resulting freezant and water at a temperature above 0° C., separating the water from said freezant, and recycling the freezant to said chamber.

5. The method of introducing solid food particles into a liquid ebullient fluorine-containing halogenated alkane freezant of 1-4 carbon atoms having a boiling point within the range of about −5° C. to about −50° C. and a liquid density great enough at the boiling point of the freezant to float said particles which comprises maintaining a bath of said liquid freezant, continuously introducing said food particles into said liquid freezant in a manner such that each individual particle is not in contact with any other solid material as it enters the freezant, and continuously conveying the floating food particles away from the point at which they enter the freezant.

6. The method of claim 5 in which said liquid freezant is dichlorodifluoromethane.

References Cited

UNITED STATES PATENTS

| | | | |
|---|---|---|---|
| 1,944,857 | 1/1934 | Atwell | 62—374 |
| 2,059,970 | 11/1936 | Robillard | 62—63 |
| 2,502,527 | 4/1950 | McFarlan | 62—64 |
| 2,751,687 | 6/1956 | Colton. | |
| 3,162,019 | 12/1964 | Porter et al. | 62—74 X |
| 3,187,514 | 6/1965 | Rendos | 62—64 X |
| 3,228,838 | 1/1966 | Rinfret et al. | 167—74 |

ROBERT A. O'LEARY, *Primary Examiner.*

W. E. WAYNER, *Assistant Examiner.*